(No Model.)
J. DOYLE.
BATTERY ZINC.
No. 385,254. Patented June 26, 1888.
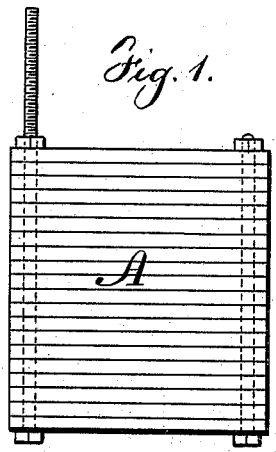
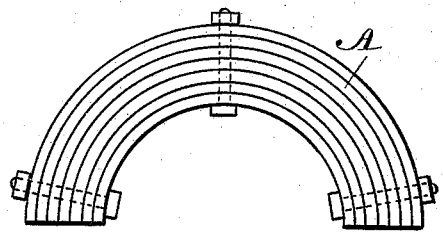
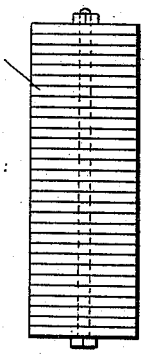
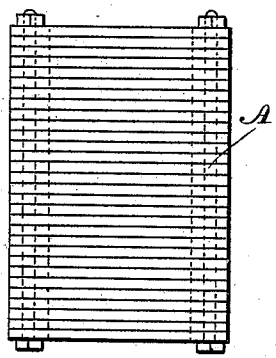
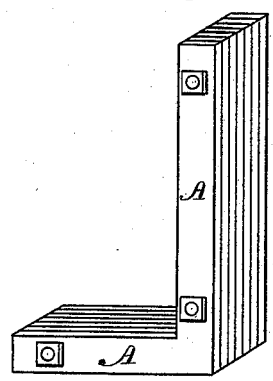
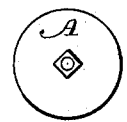
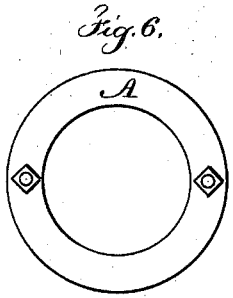
Witnesses:
Inventor,
John Doyle.
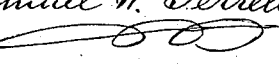

UNITED STATES PATENT OFFICE.

JOHN DOYLE, OF HOBOKEN, NEW JERSEY, ASSIGNOR TO HIMSELF, AND C. COLES DUSENBURY, OF LAKE MAHOPAC, NEW YORK.

BATTERY-ZINC.

SPECIFICATION forming part of Letters Patent No. 385,254, dated June 26, 1888

Application filed March 19, 1888. Serial No. 267,661. (No model.)

*To all whom it may concern:*

Be it known that I, JOHN DOYLE, of Hoboken, in the county of Hudson and State of New Jersey, have invented an Improvement in Electric Batteries, of which the following is a specification.

In electric or galvanic batteries the zinc or positive element has usually been amalgamated with mercury upon its surface, to render the operation more uniform and the electrode more efficient; but the action of the acid is such that the mercury frequently has to be replenished, which consumes considerable time and renders the battery unequal in its action, the same being much stronger at one time than another.

The object of my present invention is to effect a progressive and continuous amalgamation of the surface of the zinc or other metal, so as to render the action of the electrode nearly uniform until the same is consumed or becomes too small for efficient service.

In carrying out my said invention I make use of plates, bars, or strips of zinc or other metal and amalgamate the surface of the same with mercury, and I secure these plates, bars, or strips together to form the electrode, and in so doing the amalgamated surfaces are brought into contact so closely as to prevent the exciting-liquid passing in between one plate and the next; hence the action of the exciting-liquid is upon the exterior surfaces only of the electrode, and as these become consumed the mercury from the adjacent surfaces spreads upon the exterior of the electrode, amalgamating the same progressively and maintaining the proper condition and action of the same. The shape and size of this electrode will vary according to the battery in which it is made use of. I have represented in the drawings a variety of forms in which said electrode may be made.

Figure 1 is an elevation of an electrode made up of a series of flat plates. Fig. 2 is a plan view of my electrode as composed of semicircular plates set together. Fig. 3 is an elevation, and Fig. 4 a plan view, of an electrode made of a range of circular plates or disks. Fig. 5 is an elevation, and Fig. 6 a plan, of the electrode composed of a range of flat rings. Fig. 7 is a perspective view of an electrode composed of a series of L-shaped bars, and Fig. 8 represents the end of an amalgamated strip rolled up into the form of a coil or volute.

In all cases the plates A are to be amalgamated with mercury upon the respective surfaces, applied in any convenient manner, and the plates are to fit together sufficiently tight for the mercury to fill the space between one plate and the next and prevent the exciting-liquid passing in between such plates, and suitable tie-rods and clamps are to be applied to bind these plates tightly together. In some forms I have found it advantageous to make use of brass rods passing through holes in the respective plates, and either riveted up or provided with nuts upon the respective ends, so as to clamp the set of plates firmly together, and one of these tie-rods may be extended to receive the binding-post or other attachment for the electric-circuit wire, and it may be coated with india-rubber or similar material, to prevent the action of the exciting-liquid upon the same. When the sheet is amalgamated and rolled up tightly, as in Fig. 8, the outer end of the metal may be secured in any suitable manner.

When in use, the consumption of zinc or other metal of the electrode releases the mercury from time to time at the edge of the mercury-space between one plate and the next, so that such mercury spreads over the edges of the plates and amalgamates the same progressively, and the electrode is kept in constant condition for operation, and seldom or never requires further amalgamation, and it continues in operation until it is reduced in size, so as no longer to be properly serviceable.

If desired, the bars, strips, or plates might be soldered on the edges at places to hold them in position, the solder being covered with asphalt or other material to protect it from the action of the exciting-liquid.

I claim as my invention—

1. An electrode for a battery, composed of sheets, plates, bars, or strips having the surface amalgamated with mercury and fastened together, substantially as set forth.

2. An electrode for a battery, composed of plates, bars, or strips of metal, the surfaces of which are amalgamated with mercury and placed closely together, in combination with rods passing through holes in the plates to tie the same firmly together, substantially as set forth.

Signed by me this 13th day of March, 1888.

JOHN DOYLE.

Witnesses:
   GEO. T. PINCKNEY,
   WILLIAM G. MOTT.